United States Patent Office 3,228,832
Patented Jan. 11, 1966

3,228,832
ANTHELMINTIC COMPOSITIONS AND METHODS OF USING SAME
Alfred Margot and Alois Kleemann, Basel, Switzerland, assignors to Geigy Chemical Corporation, Greenburgh, N.Y., a corporation of Delaware
No Drawing. Filed Jan. 18, 1963, Ser. No. 252,312
Claims priority, application Switzerland, Jan. 30, 1962, 1,114/62
10 Claims. (Cl. 167—53)

The present invention relates to new carboxylic acid amides with excellent anthelmintic properties, to the preparation thereof and to anthelmintically active compositions for controlling gastro-intestinal worms, which compositions contain these new active ingredients.

It has been found that compounds of the formula

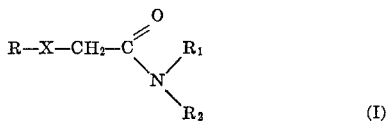

(I)

wherein

R represents an alkyl, an alkoxy-alkyl or an alkylthio-alkyl radical, containing at least 10 and maximally 18 carbon atoms, each of $R_1$ and $R_2$ represent independently hydrogen or a lower alkyl radical, preferably of not more than 4 carbon atoms, and X represents oxygen or sulfur, haxe excellent anthelmintic properties, possess a low toxicity against warm-blooded animals, and are therefore particularly suitable in veterinary medicine as internal therapeutic compositions against parasitic and pathogenic worms, such as, especially, Ascaridia and Oxyuridae.

The compounds of Formula I are obtained according to the present invention in a manner known per se by reacting a compound of formula

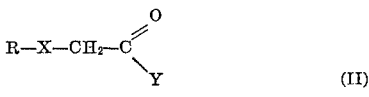

(II)

wherein

R and X have the above indicated significance and

Y represents a halogen atom, an alkoxy group, the hydroxyl group or the grouping O—Me, Me representing an alkali- or alkaline earth metal atom, with ammonia or a lower molecular alkyl or dialkyl amine or with a reactive derivative of an alkyl or dialkyl amine, if desired in the resence of a solvent.

According to a further process, compounds of Formula I are obtained by reacting a reactive ester, in particular a halide, of a compound of formula

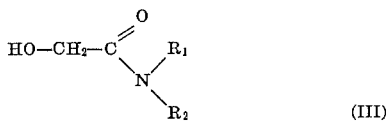

(III)

wherein $R_1$ and $R_2$ have the meaning given above,
with an alkali metal salt of an alcohol or mercaptan of formula

R—X—H (IV)

wherein R and X have the meanings given above, if necessary in the presence of a solvent and at an elevated temperature.

For both preparation methods, aliphatic and aromatic hydrocarbons, in particular, may be considered as solvents. The necessary reaction temperatures lie between 10° and 200° C.

The compounds of Formula I, obtained according to the two methods cited above, are substituted alkyloxy or alkylthio acetamides, of which the N-alkyl and dialkyl substituted derivatives of the amides of decyloxy acetic acid and of decylthio acetic acid are of particular interest. As has been stated above, reactive derivatives of alkyl or dialkyl amines can be used for the production thereof. Among these, there can be considered in particular N-dialkyl-derivatives of carbamic acid halides, alkyl isocyanates and the N,N-di-substituted amide-alkyl esters of sulphurous acid. For the second method, other esters of glycolic acid amides, more especially the toluene sulphonic acid ester, may also be used besides the above-mentioned halides as reactive derivatives of compounds of Formula III.

The compouds according to the invention are particularly suitable as anthelmintics for controlling parasitic and pathogenic worms, in particular those types of worms which are found in sheep, pigs, cattle, horses, cats, dogs and poultry. For oral administration effective doses of the active substances are used in the form of conventional veterinary-medical preparations which also contain suitable carrier substances and/or diluents. Furthermore, the active substances can be mixed together with bactericides, bacteriostatics, coccidiostatics and other anti-parasitic active substances to compositions which can be administered orally. The new active substances of formula I can be directly mixed with animal feed or with other innocuous, at least partialy digestible physiologically inert excipients, which preparations can then be administered or fed to the animals in a single dose or in several doses at regular intervals over a definite period of time. Furthermore, such feed mixtures, as well as the veterinary-medical preparations of the type described may also be fed or administered as prophylactics.

The anthelmintic compositions according to the invention can also be administered in the form of liquid or solid mixtures with food excipients, in particular of a drench suspension, or in the form of tablets, gelatin capsules or boluses, which for the oral administration can also be mixed with the food or a physiologically inert excipient.

The treatment of young chickens, infested with Ascaridia galli, is described in detail in the following. Decyloxy acetic acid-N,N-diethylamide is used as active substance.

Healthy young chickens are infested with embryonized eggs of Ascaridia galli (300 per bird). The infested chickens are subsequently fed for 7 weeks with a whole chicken feed and kept in a conditioned state. The chickens are then divided up into groups and the weight of each chicken is determined.

The above-mentioned active substance, mixed with oatmeal and water, is then given orally in three daily part doses to one of these groups of animals three times per day on three successive days. Another group serves as a control and is given whole chicken feed ad libitum as the experimental group, but without active substance.

The number of worms passing in the excrements of the individual groups is checked twice daily from the time of the first dose up to the fifth day. The chickens are then killed and the number of worms found in the intestine is determined. The results of these investigations are combined in Table I which is given below:

TABLE I

| Total dose of active substance per kg. bodyweight | No. of part doses (per day) | Duration of treatment (in days) | Excreted Ascaridia (percent values) | Healthy chickens (percent values) |
|---|---|---|---|---|
| 3,000 mg./kg. | 3 | 3 | 100 | 100 |
| Control | | | 0 | 0 |

The following table shows the results obtained when the active substances are added in homogenised form to the normal chicken feed:

TABLE II

| Total dose of active substance per kg./bodyweight | Duration of treatment (in days) | No. of excreted dead nematodes (percentage) | No. of chickens free from worms (percentage) |
|---|---|---|---|
| 2,000 mg./kg. | 2 | 100 | 100 |

As can be seen from the doses given in Table II, excellent results are obtained in the treatment of chickens infested with *Ascaridia galli* when using 2000 mg./kg. bodyweight of active substance which is administered heavily diluted. Even with a dose of 10,000 mg./kg. bodyweight the test chickens do not suffer any harm. At lease about 500 to 1500 mg./kg. should be used to achieve an anthelmintic effect.

Results which were obtained in the treatment of mice which were naturally infested with Oxyuridae, are recorded in the following. The active substance is given orally to mice on three successive days together with oatmeal and water. The mice are killed after five days and the number of Oxyuridae present in the intestine is determined. After a three day administration of 1,000 mg./kg. bodyweight of active substance, no Oxyuridae was found in the intestines of the mice.

The following non-limitative examples show methods of preparation and serve to illustrate the invention further. Parts, given therein, represent parts by weight, and temperatures are given in degrees centigrade. Example 4 describes the preparation of a spray powder which serves for the production of a drench solution.

*Example 1*

190 parts of diethyl amine and 620 parts by volume of benzene are placed in a flask. 234 parts of decyloxyacetic acid chloride (B.P.$_{12}$:144°–146°, prepared from decyloxyacetic acid and thionyl chloride) are then added drop by drop at 10°–20° whilst being stirred. An exothermic reaction then occurs. The temperature is kept at 10–20° by cooling with ice water. As the reaction progresses diethyl amine-chlorohydrate precipitates. When everything is added, the reaction mixture is stirred for 2 hours at room temperature and the precipitated crystals are filtered off by suction. The filtrate is now shaken out with water. The washing water is disposed off and the benzene solution is dried with sodium sulphate. The benzene is distilled off and the residue is distilled in vacuo. Decyloxyacetic acid diethyl amide of B.P.$_{0.01}$: 117°–119° is obtained in this manner.

The n-decylthioacetic acid-dipropyl-amide is obtained in the same manner with the use of decylthio acetic acid and dipropyl amine.

*Example 2*

6,000 parts by volume of anhydrous toluene are brought to the boil and 161 parts of sodium are added whilst being stirred. 1,162 parts of n-decanol are added drop by drop thereto at the same temperature. The mixture is then stirred under reflux until all the sodium has been converted to decanolate. 1,050 parts of chloroacetic acid diethyl amide are then added. A slightly exothermic reaction takes place and sodium chloride precipitates. The mixture is then boiled for about 13 hours overnight under reflux. It is then left to cool and filtered off by suction. The filtrate is distilled under reduced pressure in order to remove the toluene. The residue is subsequently distilled under reduced pressure. In this way n-decyloxyacetic acid diethyl amide distills at B.P.$_{0.003}$:95°–130°.

*Example 3*

73 parts of n-decyloxyacetic acid-decyl ester (B.P.$_{0.02}$: 172°–175°) and 30 parts of diethyl amide and 1 part of sodium methylate are heated for 3 hours in a bomb tube to 160°–180°. A semi-solid paste is formed thereby. This is thoroughly shaken with ether and treated with a little water. Two layers are thus formed. Separation is effected in a separating funnel. The ether solution is again washed out with water and dried with sodium sulphate. After filtering, the ether is distilled off and the residue distilled under reduced pressure. The n-decyloxyacetic acid-diethyl amide distills over at B.P.$_{0.02}$: 113°–116°.

In an analogous manner as in the above examples the following compounds are obtained:

n-Decyloxyacetic acid methylamide,
n-Decyloxyacetic acid ethylamide,
n-Decyloxyacetic acid propylamide,
n-Decyloxyacetic acid isopropylamide,
n-Decyloxyacetic acid n-butylamide,
n-Decyloxyacetic acid dimethylamide,
n-Decyloxyacetic acid diethylamide,
n-Decyloxyacetic acid di-n-propylamide,
n-Decyloxyacetic acid di-n-butylamide,
n-Dodecyloxyacetic acid diethylamide,
n-Decylthioacetic acid diethylamide,
n-Decyloxyethoxyacetic acid diethylamide,
n-Decylthioethoxyacetic acid diethylamide.

*Example 4*

A spray powder is produced by thorough grinding and mixing from 50 parts of active substance e.g. decyloxyacetic acid-N,N-diethylamide, 30 parts of diatomaceous earth, 19.5 parts of kaolin and 0.5 part of a propylene oxide-ethylene oxide condensation product. A slurry-like concentrate is obtained from this powder by stirring to a paste with water. This concentrate is particularly suitable for administration to domestic and other useful animals.

What is claimed is:

1. A process for the veterinary control of helminthiasis primarily due to gastro-intestinal worms which comprises the oral administration to an animal suffering therefrom of an amount sufficient to control gastro-intestinal worms of an active compound of the formula

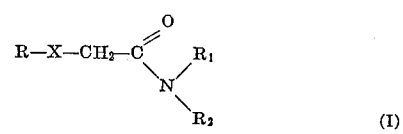

wherein

R is a member selected from the group consisting of alkyl, alkoxyalkyl and alkylthioalkyl, each containing at least 10 and maximally 18 carbon atoms, each of R₁ and R₂ is independently a member selected from the group consisting of hydrogen and alkyl containing at most 4 carbon atoms, provided that not both R₁ and R₂ are hydrogen, and X is a member selected from the group consisting of oxygen and sulfur.

2. A process as described in claim 1 wherein the helminthiasis is primarily due to Ascaridae.

3. A process as described in claim 1 wherein the helminthiasis is primarily due to Oxyuridae.

4. The process of claim 1 wherein said active compound is administered in dosage unit form.

5. The process of claim 1 wherein said active compound is administered, admixed with feed to the said animal.

6. A process for the veterinary control of helminthiasis primarily due to gastro-intestinal worms which comprises the oral administration to an animal suffering therefrom of an amount of decyloxyacetic acid diethylamide sufficient to control gastro-intestinal worms.

7. A process as described in claim 1 wherein said compound is administered in an amount of about 2000 mg. per kg. of bodyweight of the treated animal.

8. A process as described in claim 1 wherein said compound is administered in an amount of at least about 500 to 1500 mg. per kg. of bodyweight of the animal.

9. A process for the veterinary control of helminthiasis primarily due to gastro-intestinal worms which comprises the oral administration to an animal suffering therefrom of an amount of decyloxyacetic acid di-n-propylamide sufficient to control gastro-intestinal worms.

10. An anthelmintic medicated veterinary feed composition adapted to the control of intestinal nematodes comprising a major portion of an animal feed stuff and an anthelmintically effective amount of a compound of formula

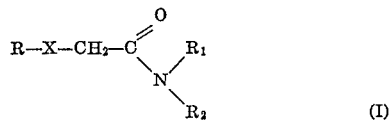

(I)

wherein

R is a member selected from the group consisting of alkyl, alkoxyalkyl and alkylthioalkyl, each containing at least 10 and maximally 18 carbon atoms, each of R₁ and R₂ is independently a member selected from the group consisting of hydrogen and alkyl containing at most 4 carbon atoms, provided that not both R₁ and R₂ are hydrogen, and X is a member selected from the group consisting of oxygen and sulfur.

References Cited by the Examiner
FOREIGN PATENTS 81,356   5/1958   Netherlands.

JULIAN S. LEVITT, *Primary Examiner.*

FRANK CACCIAPAGLIA, Jr, *Examiner.*